(12) United States Patent
Negley et al.

(10) Patent No.: US 8,283,869 B2
(45) Date of Patent: Oct. 9, 2012

(54) SEMICONDUCTOR LIGHT EMITTING CIRCUITS INCLUDING LIGHT EMITTING DIODES AND SEMICONDUCTOR SHUNT DEVICES

(75) Inventors: Gerald H. Negley, Hillsborough, NC (US); Antony P. van de Ven, Sai Kung (HK)

(73) Assignee: Cree, Inc., Durham, NC (US)

( * ) Notice: Subject to any disclaimer, the term of this patent is extended or adjusted under 35 U.S.C. 154(b) by 5 days.

(21) Appl. No.: 12/419,480

(22) Filed: Apr. 7, 2009

(65) Prior Publication Data

US 2009/0189529 A1     Jul. 30, 2009

Related U.S. Application Data

(62) Division of application No. 11/098,086, filed on Apr. 4, 2005, now Pat. No. 7,535,180.

(51) Int. Cl.
*H05B 37/00* (2006.01)
(52) U.S. Cl. ..... 315/123; 315/125; 315/119; 315/185 S; 315/312
(58) Field of Classification Search ............... 315/185 S, 315/200 A, 312–326, 119, 123, 125, 122; 362/800–812
See application file for complete search history.

(56) References Cited

U.S. PATENT DOCUMENTS

| | | | | |
|---|---|---|---|---|
| 3,135,876 A * | 6/1964 | Embree et al. | | 327/304 |
| 3,638,042 A | 1/1972 | Studtmann | | |
| 3,655,988 A | 4/1972 | Nakamura et al. | | |
| 3,913,098 A * | 10/1975 | Nakamura et al. | | 340/384.7 |
| 4,625,198 A * | 11/1986 | Williamson et al. | | 340/514 |
| 5,059,788 A | 10/1991 | Tashiro et al. | | |
| 5,125,675 A | 6/1992 | Engelbrecht | | |
| 5,357,120 A | 10/1994 | Mori | | |
| 5,467,049 A | 11/1995 | Kida et al. | | |
| 5,646,760 A | 7/1997 | Kuijk et al. | | |
| 5,798,520 A | 8/1998 | Kuijk et al. | | |
| 6,411,155 B2 | 6/2002 | Pezzani | | |
| 6,501,630 B1 | 12/2002 | Colclaser et al. | | |
| 7,109,664 B2 * | 9/2006 | Wu | | 315/185 S |
| 2001/0032985 A1 | 10/2001 | Bhat et al. | | |
| 2002/0043943 A1 * | 4/2002 | Menzer et al. | | 315/291 |

(Continued)

FOREIGN PATENT DOCUMENTS

EP     1 020 935 A2    7/2000

(Continued)

OTHER PUBLICATIONS

Notification of Transmittal of the International Search Report and the Written Opinion of the International Searching Authority, or the Declaration, International Search Report, and Written Opinion of the International Searching Authority, PCT International Application No. PCT/US2006/011820, Aug. 7, 2006.

(Continued)

*Primary Examiner* — Tuyet Thi Vo
(74) *Attorney, Agent, or Firm* — Myers Bigel Sibley & Sajovec, PA

(57) ABSTRACT

Semiconductor light emitting circuits include semiconductor light emitting diodes that are serially connected between a pair of input terminals. Four layer semiconductor devices, such as Shockley diodes and/or thyristors are also provided, a respective one of which is connected across a respective one of the semiconductor light emitting diodes. The four layer semiconductor devices can allow a string of light emitting diodes to continue to be lit if one light emitting diode fails.

20 Claims, 2 Drawing Sheets

U.S. PATENT DOCUMENTS

| | | |
|---|---|---|
| 2002/0139987 A1 | 10/2002 | Collins, III et al. |
| 2004/0042205 A1 | 3/2004 | Tanabe et al. |
| 2005/0023575 A1 | 2/2005 | Wu et al. |
| 2006/0176411 A1 | 8/2006 | Furukawa |
| 2006/0221609 A1 | 10/2006 | Ryan, Jr. |
| 2006/0232219 A1* | 10/2006 | Xu .......................... 315/209 R |
| 2008/0130283 A1* | 6/2008 | Chang .......................... 362/249 |

FOREIGN PATENT DOCUMENTS

| | | |
|---|---|---|
| JP | 49-82668 | 11/1947 |
| JP | 53-49977 | 5/1978 |
| JP | 53-75788 | 7/1978 |
| JP | 58-143489 | 7/1983 |
| JP | 59-113768 A | 6/1984 |
| JP | 4 196359 A | 7/1992 |
| JP | 2002-25784 A | 1/2002 |
| JP | 2005-310999 A | 11/2005 |

OTHER PUBLICATIONS

Translation of Official Action (English), JP Patent Application No. 2008-505383, Mar. 15, 2011.

Translation of Official Action (English), JP Patent Application No. 2008-505383, Aug. 16, 2011.

Translation of Decision of Rejection (English), JP Patent Application No. 2008-505383, Feb. 28, 2012.

Office Action and English language translation, TW Application No. 095111811, Jul. 5, 2012.

\* cited by examiner

SEMICONDUCTOR LIGHT EMITTING CIRCUITS INCLUDING LIGHT EMITTING DIODES AND SEMICONDUCTOR SHUNT DEVICES

CROSS-REFERENCE TO RELATED APPLICATION

This application is a divisional of U.S. application Ser. No. 11/098,086, filed Apr. 4, 2005 now U.S. Pat. No. 7,535,180, assigned to the assignee of the present application, the disclosure of which is hereby incorporated herein by reference in its entirety as if set forth fully herein.

FIELD OF THE INVENTION

This invention relates to semiconductor circuits, and more particularly to semiconductor light emitting circuits.

BACKGROUND OF THE INVENTION

Semiconductor light emitting circuits may include one or more semiconductor Light Emitting Diodes (LEDs). As is well known to those having skill in the art, a light emitting diode includes a plurality of semiconductor layers that are configured to emit light upon energization thereof.

In order to increase the light output of a semiconductor light emitting circuit, it may be desirable to provide multiple LEDs in the circuit. Multiple LEDs may be connected in parallel. However, to reduce or prevent current hogging by one of the LEDs, it may be desirable to provide voltage matched LEDs. Unfortunately, voltage matched LEDs may increase the cost of the semiconductor light emitting circuit. In other semiconductor light emitting circuits, a plurality of LEDs are connected in a series string. Unfortunately, if one LED in the string fails and becomes an open circuit, the entire string may fail to light due to the open circuit.

It is known to shunt one or more Zener diodes across an LED, to provide electrostatic discharge (ESD) protection. See, for example, U.S. Patent Application Publication Nos. US 2001/0032985 A1 to Bhat et al. and 2002/0139987 A1 to Collins, III et al., and European Patent Application No. EP 1 020 935 A2 to Maeda et al.

SUMMARY OF THE INVENTION

Semiconductor light emitting circuits according to exemplary embodiments of the present invention include a plurality of semiconductor light emitting diodes that are serially connected between a pair of input terminals, and a plurality of four layer semiconductor devices, a respective one of which is connected across a respective one of the plurality of semiconductor light emitting diodes. As is well known to those having skill in the art, a four layer semiconductor device can include a pnpn structure, or an npnp structure, which provides at least three pn junctions and which effectively blocks current through two terminals until it is turned on by a small signal. Four layer semiconductor devices include two terminal, four layer semiconductor devices, such as Shockley diodes, or three or more terminal four layer semiconductor devices, such as Semiconductor Controlled Rectifiers (SCR) or thyristors. The respective four layer semiconductor device may be connected across a respective LED in parallel, such that an anode of a respective LED is connected to an anode of a respective four layer semiconductor device. In some embodiments, a single semiconductor LED and one or more four layer semiconductor devices connected thereacross, may be provided.

In some embodiments, the four layer semiconductor device has a peak forward voltage that is approximately equal to the LED forward voltage. In some embodiments, the LED and the four layer semiconductor device comprise a same semiconductor material, such as silicon, silicon carbide and/or gallium nitride. In some embodiments, respective LED and four layer semiconductor devices are integrated on a common semiconductor substrate. Moreover, in some embodiments, a constant current source is connected to the pair of input terminals. In other embodiments, a power source is connected to the pair of input terminals and is responsive to a change in voltage across the input terminals, to increase a current provided through the LEDs.

In yet other embodiments, a semiconductor light emitting circuit includes a plurality of LEDs having a diode forward voltage, that are serially connected between a pair of input terminals, and a plurality of semiconductor shunt devices having a shunt device forward voltage that is approximately equal to the diode forward voltage. A respective shunt device is connected across a respective LED. The semiconductor shunt device may be a four layer semiconductor device as described above, may be connected and/or integrated as described above and may employ a constant current source or a power source as was described above.

Semiconductor light emitting circuits according to still other embodiments of the present invention include an LED having a diode anode and a diode cathode and a semiconductor shunt device having a shunt device anode and a shunt device cathode. The semiconductor shunt device does not emit light and is connected in parallel to the LED, such that the LED anode is connected to the shunt device anode, and the LED cathode is connected to the shunt device cathode. A Direct Current (DC) power supply is connected across the diode anode/shunt device anode and the diode cathode/shunt device cathode. Four layer semiconductor devices, connections, integration, constant current sources and/or power sources also may be provided, as was described above.

DETAILED DESCRIPTION

The present invention now will be described more fully hereinafter with reference to the accompanying drawings, in which illustrative embodiments of the invention are shown. This invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element. Thus, a first terminal discussed below could be termed a second terminal without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
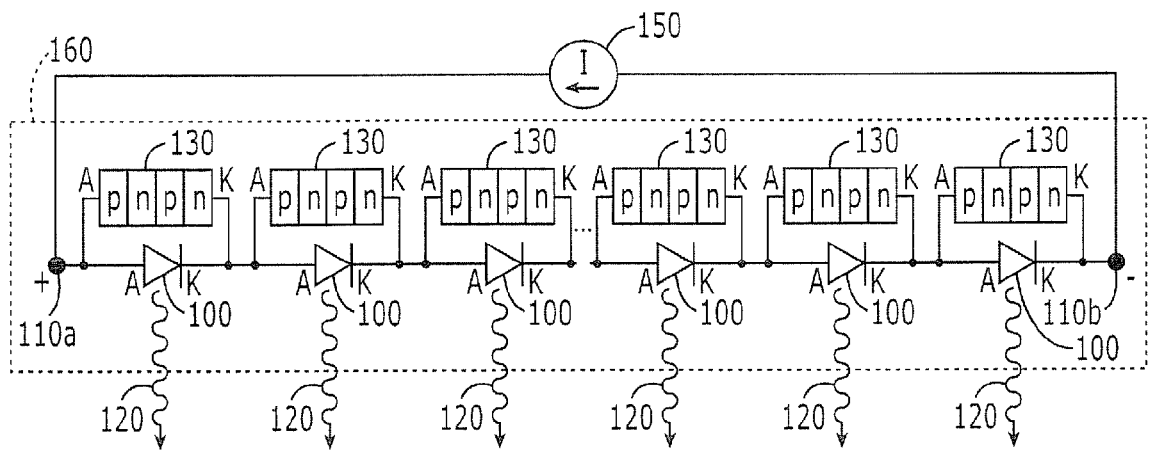
FIGS. 1-5 are circuit diagrams of semiconductor light emitting circuits according to various embodiments of the present invention.

FIG. 1 is a circuit diagram of semiconductor light emitting circuits according to various embodiments of the present invention. As illustrated in FIG. 1, a semiconductor light emitting circuit includes a plurality of LEDs 100 that are serially connected between a pair of input terminals 110a, 110b. As is well known to those having skill in the art, an LED includes an anode A and a cathode K, and the serial connection causes a cathode K of a preceding LED 100 to be connected to an anode A of a succeeding LED 100 between the pair of input terminals 110a, 110b. When energized by an appropriate Alternating Current (AC) and/or Direct Current (DC) power source, the LEDs emit light 120 in the visible and/or invisible (e.g., ultraviolet and/or infrared) spectrum.

Still referring to FIG. 1, a plurality of four layer (i.e., three or more pn junction) semiconductor devices 130 are provided, a respective one of which is connected across a respective one of the plurality of LEDs 100. In FIG. 1, pnpn four layer semiconductor devices 130 are shown. However, it will be understood that opposite conductivity npnp four layer semiconductor devices also may be provided. In other embodiments, a single light emitting diode 100 and a single four layer semiconductor device 130 is provided. It will be understood that embodiments of the invention also contemplate circuit connections between the light emitting diodes 100 and the four layer semiconductor devices 130 that are not one-to-one. For example, two or more four terminal semiconductor devices 130 may be connected across a single light emitting diode 100 and vice versa.

Various embodiments of four layer semiconductor devices may be provided according to various embodiments of the present invention. For example, two terminal and/or three terminal four layer semiconductor devices may be provided. Thus, for example, in FIG. 2, the four layer semiconductor devices comprise a plurality of Shockley diodes 230. As is well known to those having skill in the art, a Shockley diode 230 includes an anode A and a cathode K. When the anode A is biased positively with respect to the cathode K, the device is forward biased. However, the forward bias condition of this diode can be considered in two separate states: the high impedance or forward blocking state, and the low impedance or forward conducting state. The device switches from the blocking to the conducting states at a peak forward voltage $V_p$.

Figure 2:
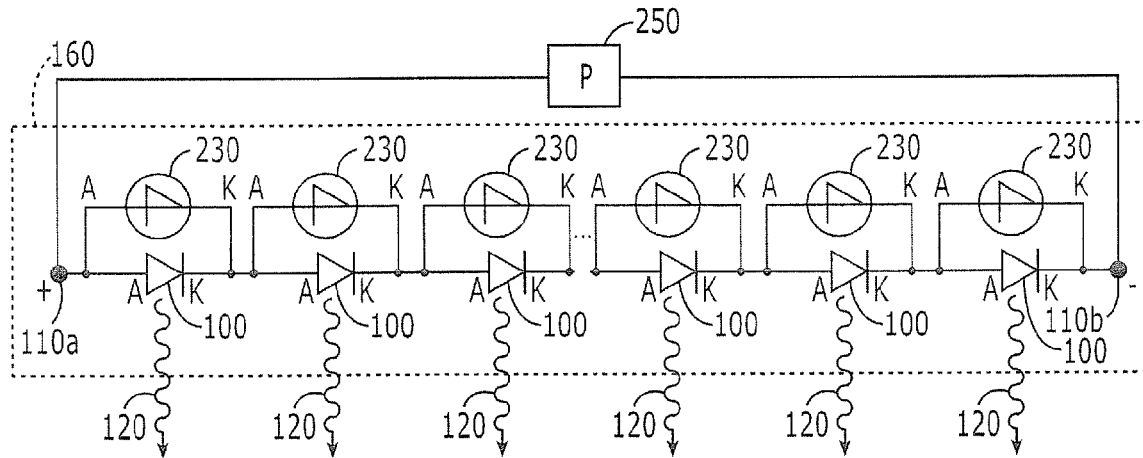
Figure 3:
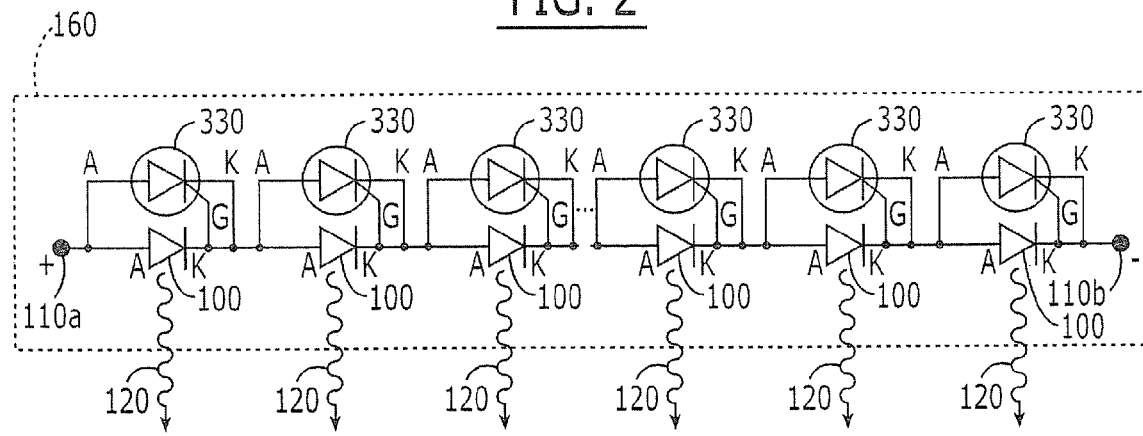

Moreover, as shown in FIG. 3, a three terminal four layer semiconductor device, such as a thyristor, also referred to as an SCR, 330 also may be used. As is well known to those having skill in the art, a thyristor 330 is similar to the Shockley diode 230, except that a third lead (gate) is included. When the thyristor is biased in the forward blocking mode, a small current supply to the gate can initiate switching to the conducting state. Accordingly, the thyristors 330 of FIG. 3 remain off until a corresponding LED 100 fails, at which time it is turned on. It will also be understood by those having skill in the art that, as used herein, a "three terminal four layer semiconductor device" also includes a four or more layer semiconductor device having more than three terminals, such as a multiple gate thyristor. It will also be understood that embodiments of FIGS. 1-3 may be combined in various combinations and subcombinations of four layer semiconductor devices, Shockley diodes and/or thyristors.

Still referring to FIGS. 1-3, in some embodiments, the plurality of four layer semiconductor devices 130, 230 and/or 330 are connected across a respective one of the plurality of LEDs 100 in parallel, such that an anode 100A of an LED is connected to an anode 130A, 230A and/or 330A of a respective four layer semiconductor device 130, 230 and/or 330. In other embodiments, the plurality of LEDs 100 have a diode forward voltage, and the plurality of four layer semiconductor devices 130, 230 and/or 330 have a peak forward voltage $V_p$ that is approximately equal to the diode forward voltage. In still other embodiments, the plurality of semiconductor light emitting diodes 100 and the plurality of four layer semiconductor devices 130, 230 and/or 330 comprise a same semiconductor material. For example, the LEDs 100 and the four layer semiconductor devices 130, 230 and/or 330 may be fabricated using silicon semiconductor technology, silicon carbide semiconductor technology, gallium nitride semiconductor technology or combinations of the above, such as gallium nitride on silicon carbide or silicon technology. In some embodiments, at least one LED 100 and at least one four layer semiconductor device 130, 230 and/or 330 are integrated on a common semiconductor substrate 160. However, in other embodiments, different substrates of the same semiconductor material may be provided. By using the same semiconductor material, the diode forward voltage and the four layer semiconductor device peak forward voltage may be made approximately equal. In other embodiments, different semiconductor materials may be used, and other techniques may be used to make the forward voltages approximately equal if so desired. As used herein, approximately, equal" means within about 10%.

Referring again to FIG. 1, in some embodiments, a constant current source 150 is connected to the pair of input terminals 110a, 110b. The constant current source 150 may be embodied by a conventional constant current driver circuit that is configured for connection to an AC and/or DC power supply. In other embodiments, as shown in FIG. 2, a power source 250 is connected to the pair of input terminals 110a, 110b, and is responsive to a change in a voltage across the input terminals 110a, 110b, to increase a current provided through the semiconductor light emitting diodes 100. The power source 250 may be embodied by a conventional power driver circuit and controller, that are configured for connection to an AC and/or DC power supply. It will be understood by those having skill in the art that any of the power sources 150, 250 may be used with any of the embodiments of FIGS. 1-3.

Figure 4:
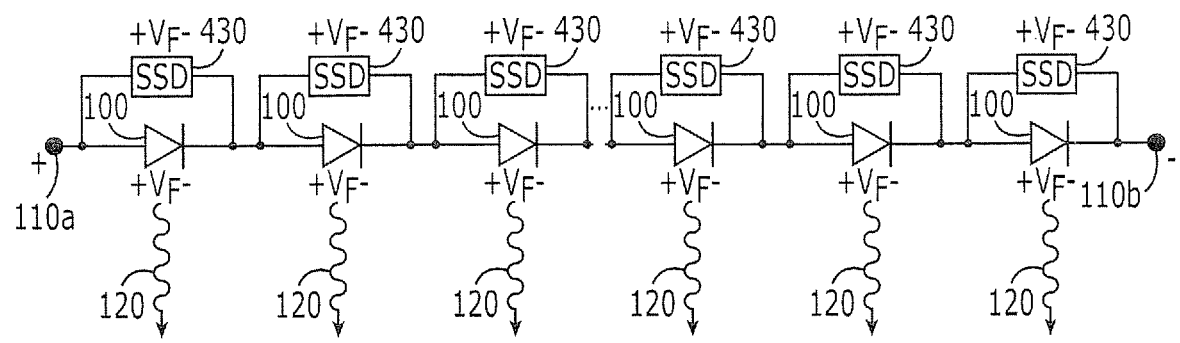

FIG. 4 is a circuit diagram of semiconductor light emitting circuits according to other embodiments of the present invention. In FIG. 4, a plurality of non-light emitting Semiconductor Shunt Devices (SSD) 430 are provided, a respective one of which is connected across a respective one of the LEDs 100. As shown in FIG. 4, in these embodiments, the forward voltage $V_F$ of the semiconductor shunt devices 430 and the LEDs 100 are approximately equal. As used herein, "approximately equal" means within about 10%. The semiconductor shunt devices 430 may include a four layer semiconductor device 130, such as a Shockley diode 230 or a thyristor 330, a two layer semiconductor device, such as a diode, and/or a three layer semiconductor device, such as a transistor. Two, three or more terminal devices also may be used. As also shown in FIG. 4, a respective SSD 430 is connected in parallel with a respective LED 100, such that the forward voltages $V_F$ of both devices extend in parallel rather than in antiparallel, as shown by the + and − signs in FIG. 4.

Figure 5:
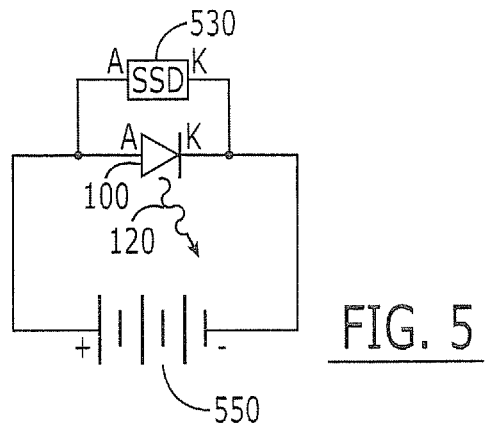

FIG. 5 is a circuit diagram of semiconductor light emitting circuits according to still other embodiments of the present invention. In these embodiments, a semiconductor shunt device 550, having a shunt device anode 530A and a shunt device cathode 530K, is connected in parallel to a semiconductor LED 100, such that the LED anode 100A is connected to the shunt device anode 530A and the LED cathode 100K is connected to the shunt device cathode 530K. A Direct Current (DC) power supply 550 is connected across the diode anode/shunt device anode, and the diode cathode/shunt device cathode, as shown. As was also described above, connections other than one-to-one may be used. It also will be understood that embodiments of FIGS. 4 and 5 may be used in combination with one another, and in various combinations/subcombinations with embodiments of FIGS. 1-3.

Additional discussion of various embodiments of the present invention now will be provided. Embodiments of the invention can place a "shunting device" in parallel with an LED when the LEDs are configured into a series string. In this way, if one LED fails (becomes an open circuit), the rest of the string still may be lit. A power supply 250 and/or other control circuit can be included to detect the loss of the LED and to compensate the brightness by changing the drive to the remaining LEDs. The shunting device can include a four layer semiconductor device (FIGS. 1-3), such as a Shockley diode (FIG. 2), or a thyristor (FIG. 3), in two, three, four or more terminal configurations.

More specifically, in many LED applications, parallel wiring configurations are used to circumvent the potential failure mode of one LED becoming an open circuit. However, it may be desirable to voltage match the LEDs when parallel wiring, to reduce or prevent current hogging and/or uneven illumination. This may undesirably increase cost. Moreover, to obtain highly efficient current drivers, it may be desirable to use high voltage strings. Hence, for these and/or other reasons, it may be desirable for high efficiency LED-based lighting systems to use high voltage strings that are provided by series connections of LEDs.

Four layer semiconductor shunting devices of FIGS. 1-3 need not add much voltage to the series string of LEDs if one or more of the LEDs fail. For example, a Zener diode is conventionally used in an antiparallel arrangement for ESD protection, with a breakdown voltage of 5V or 7V (typically greater than the LED forward voltage). Then, if the LED fails, voltage is added to the LED string in amount equal to the Zener breakdown voltage minus the forward voltage of the LED that has become open circuited. In contrast, in some embodiments of the present invention, four layer semiconductor devices of FIGS. 1-3 can provide an on-conduction forward voltage that can be approximately equal to the original forward voltage of the failed LED. Accordingly, the high efficiency of the driver circuit may be maintained by not appreciably lowering the forward voltage of the LED string, and by operating the driver at a desired operating level.

Forward voltage changes may be reduced or prevented from impacting the brightness of the LEDs in the string by driving with a constant current source, in some embodiments, such as FIG. 1. In other embodiments, the variation in the forward voltage may be detected and used to increase the current through the LED string to bring the light back up to the original value, such as FIG. 2. This increase in current can be obtained by increasing the current output of a current source in an analog manner, by increasing the on time in a pulse-width-modulated system, and/or by other conventional techniques. This technique may be used, for example, in traffic lights or backlighting, where uniformity of total lumen output may be desirable, and may be particularly desirable if mixing optics are used to mix the light from a few strong sources.

Moreover, in other embodiments, as shown, for example, in FIG. 4, a semiconductor shunt device may be provided across a respective LED, wherein the semiconductor shunt device is connected in parallel (rather than antiparallel) with the LED, so that their forward voltages extend in the same sense. These embodiments may be contrasted with conventional Schottky diodes, which are conventionally connected in antiparallel, so that their forward voltages extend in the opposite sense from the LED, but the reverse breakdown voltage extends in the same sense as an LED. Moreover, in embodiments of FIG. 5, a semiconductor shunt device can be connected in parallel with a respective LED, so that the anodes are connected together and the cathodes are connected together when a DC power source is used. Again, this may contrast with conventional Schottky diode ESD protection, wherein the Schottky diode is connected in antiparallel with the diode when a DC power source is used.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A semiconductor light emitting circuit comprising:
    a plurality of semiconductor light emitting diodes having a diode forward voltage, that are serially connected between a pair of input terminals; and
    a plurality of semiconductor shunt devices having a shunt device forward voltage that is approximately equal to the diode forward voltage, a respective one of which is connected across a respective one of the plurality of semiconductor light emitting diodes, so as to turn on upon failure of the respective one of the plurality of semiconductor light emitting diodes and preserve the serial connection between the pair of input terminals.

2. A circuit according to claim 1 wherein the plurality of semiconductor shunt devices comprise a plurality of three terminal four layer semiconductor devices.

3. A circuit according to claim 1 wherein the plurality of semiconductor shunt devices comprise a plurality of Shockley diodes or a plurality of thyristors.

4. A circuit according to claim 1 wherein the plurality of semiconductor shunt devices are connected across a respective one of the plurality of semiconductor light emitting diodes in parallel, such that an anode of a respective semiconductor light emitting diode is connected to an anode of a respective semiconductor shunt device.

5. A circuit according to claim 1 wherein the plurality of semiconductor light emitting diodes and the plurality of semiconductor shunt devices comprise a same semiconductor material.

6. A circuit according to claim 1 wherein a respective semiconductor light emitting diode and a respective semiconductor shunt device are integrated on a common semiconductor substrate.

7. A circuit according to claim 1 further comprising a constant current source that is connected to the pair of input terminals.

8. A circuit according to claim 1 further comprising:
a power source that is connected to the pair of input terminals and is responsive to a change in a voltage across the input terminals to increase a current provided through the semiconductor light emitting diodes.

9. A circuit according to claim 1 wherein the plurality of semiconductor shunt devices are a plurality of non-light emitting semiconductor shunt devices.

10. A circuit according to claim 1 wherein the plurality of semiconductor shunt devices are a plurality of non-light responsive semiconductor shunt devices.

11. A semiconductor light emitting circuit comprising:
a semiconductor light emitting diode having a diode anode and a diode cathode;
a semiconductor shunt device having a shunt device anode and a shunt device cathode and connected in parallel to the semiconductor light emitting diode such that the light emitting diode anode is connected to the shunt device anode, the light emitting diode cathode is connected to the shunt device cathode and the semiconductor shunt device turns on upon failure of the semiconductor light emitting diode; and
a direct current (DC) power supply that is connected across the diode anode/shunt device anode and the diode cathode/shunt device cathode.

12. A circuit according to claim 11 wherein the semiconductor shunt device comprises a three terminal four layer semiconductor device.

13. A circuit according to claim 11 wherein the semiconductor shunt device comprises a Shockley diode or a thyristor.

14. A circuit according to claim 11 wherein the semiconductor light emitting diode has a diode forward voltage and wherein the semiconductor shunt device has a peak forward voltage that is approximately equal to the diode forward voltage.

15. A circuit according to claim 11 wherein the semiconductor light emitting diode and the semiconductor shunt device comprise a same semiconductor material.

16. A circuit according to claim 11 wherein the semiconductor light emitting diode and the semiconductor shunt device are integrated on a common semiconductor substrate.

17. A circuit according to claim 11 wherein the DC power supply is a constant current DC power supply.

18. A circuit according to claim 11 wherein the DC power supply is responsive to a change in a voltage across the semiconductor light emitting diode to increase a current provided through the semiconductor light emitting diode.

19. A circuit according to claim 11 wherein the semiconductor shunt device is a non-light emitting semiconductor shunt device.

20. A circuit according to claim 11 wherein the semiconductor shunt device is a non-light responsive semiconductor shunt device.

* * * * *